US011116240B2

(12) United States Patent
Carpenter et al.

(10) Patent No.: US 11,116,240 B2
(45) Date of Patent: Sep. 14, 2021

(54) COMPOSITIONS AND METHODS FOR IMPROVING SURVIVABILITY OF AQUATIC ANIMALS

(71) Applicant: BiOWiSH Technologies, Inc., Cincinnati, OH (US)

(72) Inventors: Richard S. Carpenter, West Chester, OH (US); JoElla Barnes, Arcola, IL (US); John Kennedy Crockett, Kingsville, TX (US)

(73) Assignee: BiOWiSH Technologies, Inc., Cincinnati, OH (US)

( * ) Notice: Subject to any disclaimer, the term of this patent is extended or adjusted under 35 U.S.C. 154(b) by 0 days.

(21) Appl. No.: 16/425,145

(22) Filed: May 29, 2019

(65) Prior Publication Data

US 2019/0364926 A1    Dec. 5, 2019

Related U.S. Application Data

(60) Provisional application No. 62/677,372, filed on May 29, 2018.

(51) Int. Cl.
| | |
|---|---|
| *A23K 10/16* | (2016.01) |
| *A23K 20/163* | (2016.01) |
| *A23K 20/22* | (2016.01) |
| *A23K 20/24* | (2016.01) |
| *A23K 50/80* | (2016.01) |
| *C02F 3/34* | (2006.01) |

(52) U.S. Cl.
CPC ............ *A23K 10/16* (2016.05); *A23K 20/163* (2016.05); *A23K 20/22* (2016.05); *A23K 20/24* (2016.05); *A23K 50/80* (2016.05); *C02F 3/341* (2013.01)

(58) Field of Classification Search
CPC ...... A23K 10/16; A23K 20/163; A23K 20/22; A23K 20/24; A23K 50/80; A23K 10/18; C02F 3/341; Y02A 40/81; A01K 61/59; A01K 61/13
See application file for complete search history.

(56) References Cited

U.S. PATENT DOCUMENTS

| | | |
|---|---|---|
| 5,627,069 A | 5/1997 | Powlen |
| 6,025,152 A | 2/2000 | Hiatt |
| 6,410,305 B1 | 6/2002 | Miller et al. |
| 7,037,708 B1 | 5/2006 | Runge et al. |
| 8,747,873 B2 | 6/2014 | Yin et al. |
| 9,302,924 B1 | 4/2016 | Showell et al. |
| 9,510,568 B2 | 12/2016 | Chen et al. |
| 9,717,767 B2 | 8/2017 | Carpenter et al. |
| 10,004,768 B2 | 6/2018 | Kubo |
| 10,022,409 B2 | 7/2018 | Carpenter et al. |
| 10,081,562 B2 * | 9/2018 | Showell ............... C02F 3/02 |
| 10,252,928 B2 | 4/2019 | Showell et al. |
| 10,336,636 B2 | 7/2019 | Showell et al. |
| 2003/0109025 A1 | 6/2003 | Durand et al. |
| 2004/0042972 A1 | 3/2004 | Truong-Le et al. |
| 2004/0086491 A2 | 5/2004 | Monte |
| 2006/0165661 A1 | 7/2006 | Speelmans et al. |
| 2006/0188978 A1 | 8/2006 | Grant |
| 2007/0060477 A1 | 3/2007 | Pedersen |
| 2007/0134493 A1 | 6/2007 | Meghpara |
| 2007/0269515 A1 | 11/2007 | Henriksen |
| 2008/0260923 A1 | 10/2008 | Kratky et al. |
| 2009/0042267 A1 | 2/2009 | Park |
| 2009/0169531 A1 | 7/2009 | Lacoste et al. |
| 2009/0269307 A1 | 10/2009 | Albers et al. |
| 2009/0274662 A1 | 11/2009 | Magowan |
| 2010/0074994 A1 | 3/2010 | Harel |
| 2011/0014278 A1 | 1/2011 | Derrieu |
| 2011/0110894 A1 | 5/2011 | Drahos et al. |
| 2011/0269220 A1 | 11/2011 | Van Slyke |
| 2012/0083412 A1 | 4/2012 | Trevino et al. |
| 2012/0084886 A1 | 4/2012 | Lopez-Cervantes et al. |
| 2013/0337518 A1 | 12/2013 | Razavi-Shirazi |
| 2014/0342437 A1 | 11/2014 | Carpenter et al. |
| 2015/0336828 A1 | 11/2015 | Greenwald et al. |

(Continued)

FOREIGN PATENT DOCUMENTS

| | | |
|---|---|---|
| CN | 100374547 | 3/2008 |
| CN | 101294142 A | 10/2008 |

(Continued)

OTHER PUBLICATIONS

Anonymous, "Biological Help for the Human Race Wastewater Treatment Solutions," 2011, pp. 1-12, Chicago, IL, USA.
Application Data Sheet 4950-01, Dissolved Oxygen Measurement in Wastewater Treatment, Water and Wastewater Industry, Emerson Process Management, http://www2.emersonprocess.com/siteadmincenter/PM%20Rosemount%20Analytical%20Documents/Liq_ADS_4950-01.pdf, 2009.

(Continued)

*Primary Examiner* — Robert S Cabral
(74) *Attorney, Agent, or Firm* — Cooley LLP; Cynthia A. Kozakiewicz; Ivor R. Elrifi

(57) ABSTRACT

The present invention relates to a method of raising an aquatic animal in an aquaculture system, the method comprising: (a) contacting the aquaculture system with a water-treatment composition over a first period of time, wherein the water-treatment composition comprises *Bacillus subtilis, Bacillus amyloliquefaciens, Bacillus licheniformis, Bacillus pumilus, Bacillus mojavensis, Pediococcus acidilactici, Pediococcus pentosaceus*, and *Lactobacillus plantarum*; and (b) contacting the aquaculture system with a feed additive composition to feed the aquatic animal over a second period of time, wherein the feed additive composition comprises *Pediococcus acidilactici, Pediococcus pentosaceus, Lactobacillus plantarum*, and *Bacillus subtilis* 34 KLB.

27 Claims, 3 Drawing Sheets
Specification includes a Sequence Listing.

(56) References Cited

U.S. PATENT DOCUMENTS

| | | |
|---|---|---|
| 2016/0017622 A1 | 1/2016 | Regester |
| 2016/0029666 A1 | 2/2016 | Carpenter et al. |
| 2016/0089403 A1 | 3/2016 | Kubo |
| 2016/0312252 A1 | 10/2016 | Carpenter et al. |
| 2017/0042162 A1 | 2/2017 | Santra et al. |

FOREIGN PATENT DOCUMENTS

| | | |
|---|---|---|
| CN | 101473896 A | 7/2009 |
| CN | 101503664 A | 8/2009 |
| CN | 101538538 | 9/2009 |
| CN | 101612169 A | 12/2009 |
| CN | 102399733 A | 4/2012 |
| CN | 102599348 A | 7/2012 |
| CN | 102987079 A | 3/2013 |
| CN | 103 087 918 B | 5/2013 |
| CN | 103 484 413 A | 1/2014 |
| CN | 104232510 | 12/2014 |
| DE | 19617331 A1 | 11/1997 |
| EP | 0410877 A1 | 1/1991 |
| EP | 0720974 A1 | 7/1996 |
| GB | 2478929 A | 9/2011 |
| JP | 2001-299328 | 10/2001 |
| WO | WO 98/56366 A1 | 12/1998 |
| WO | WO 2002/078450 A1 | 10/2002 |
| WO | WO 2009/038530 A1 | 3/2009 |
| WO | WO 2010/138522 A2 | 12/2010 |
| WO | WO 2014/183117 A1 | 11/2014 |
| WO | WO 2014/189963 A1 | 11/2014 |
| WO | WO 2015/056185 A1 | 4/2015 |
| WO | WO 2016/019017 A1 | 2/2016 |
| WO | WO 2016/070174 A1 | 5/2016 |
| WO | WO 2016/073981 A1 | 5/2016 |
| WO | WO 2018/014921 A1 | 1/2018 |

OTHER PUBLICATIONS

Baetge et al. "Complete nucleotide and deduced amino acid sequence of bovine phenylethanolamine N-methyltransferase: Partial amino acid homology with rat tyrosine hvdroxvlase" Proc. Natl. Acad. Sci. USA, vol. 83, p. 5454-5458, (1986).

British Geological Survey "Limestone", Mineral Planning Factsheet, Office of the Deputy Prime Minister, 2006, p. 1-9.

Chan, Ada Mingwah: "Investigation of Dairy Wastewater Using Biowish TM", Master of Science Thesis, p. 1-142, (2014).

Choe D. et al., "Egg production, faecal pH and microbial population, small intestine morphology, and plasma and yolk cholesterol in laying hens given liquid metabolites produced by Lactobacillus plantarum strains", British Poultry Science, vol. 53, No. 1, p. 106-115 (2012).

Deng, Bin et al.: "The Denitrification Characteristics of Pseudomonas stutzeri SC221-M and Its Application to Water Quality Control in Grass Carp Aquaculture", PLOS ONE, vol. 9, No. 12, p. e114886, (2014).

Downes et al., "Determination of Cyanuric Acid Levels in Swimming Pool Waters by u.v. Absorbance, HPLC and Melamine Cyanurate Precipitation", Water Res., vol. 18, No. 3, pp. 277-280, (1984).

Encyclopedia of Food and Color Additives. Dextrose monohydrate. Soy lecithin. CRC Press (publisher). First edition, Copyright 1997, CRC Press, Inc. Ed.: George A. Burdock, Ph.D., Boca Raton, FL, p. 797, 1553, 1554.

United States Environmental Protection Agency, Final Risk Assessment of Bacillus Subtilis, Feb. 1997, 17 pages.

Gorsuch et al. "Aerobic Nitrification and Denitrification among Heterotrophic Bacterial Isolates from a Commercial Water Treatment Product (BiOWiSH™Aqua)", Research Study, Dec. 2015, 14 pages.

Gude et al. "Biodiesel from waste cooking oils via direct sonication", Applied Energy, vol. 13. 109, p. 135-144 (2013).

Hageman "Single, chemically defined sporulation medium for Bacillus subtilis; growth, sporulation, and extracellular protease production", Journal of Bacteriology, 1984, 160 (1), 438-441.

Hellinga et al. "The Sharon process; An innovative method for nitrogen removal from ammonium-rich waste water", Water Science and Technology, 37 (9), 135-142 (1998).

Hommes et al. "Chemolithoorganotrophic Growth of Nitrosomononas eruopaea on Fructose", Journal of Bacteriology, 185 (23), 6809-6814 (2003).

Huang, Ting-Lin et al. "Nitrogen Removal from Micro-Polluted Reservoir Water by Indigenous Aerobic Denitrifiers", International Journal of Molecular Sciences, vol. 16, No. 4, p. 8008-8026 (2015).

Jetten et al. "Microbiology and application of the anaerobic ammonium oxidation ('anammox') process", Current Opinion in Biotechnology, 12 (3), 283-288 (2001).

Kiessling G. et al., "Long-term consumption of fermented daily products over 6 months increases HDL cholesterol", European Journal of Clinical Nutrition, vol. 56, No. 9, p. 843-849 (2002).

Kim et al. "Aerobic nitrification-denitrification by heterotrophic Bacillus strains", Bioresource Technology, 96(17), p. 1897-1906 (2005).

Koops et al. Distribution and ecophysiology of the nitrifying bacteria emphasizing cultured species, FEMS Microbiology Ecology, 37(1), 1-9 (2001).

Lee, Eva: "Investigation of a Commercial Product (BiOWiSHTM) for Nitrogen Management", M. Sc. thesis, May 2012, p. 1-131.

Nuraida, "Food Science and Human Wellness", vol. 4, p. 47-55 (2015).

O'Brien J. et al., "Equilibria in Aqueous Solutions of Chlorinated Isocyanurate", In A.J. Rubin, ed. Chemistry of Water Supply, Treatment, and Distribution, Chapter 14. Ann Arbor Science Publishers, Ann Arbor, Michigan (1974).

Prosser "Autotrophic nitrification in bacteria", Advances in microbial physiology, 30, p. 125-181(1989).

Rajakumar S. et al.: "Nitrate removal efficiency of bacterial consortium (Pseudomonas sp. KW1 and Bacillus sp. YW4) in synthetic nitrate-rich water", Journal of Hazardous Materials, vol. 157, No. 2-3, p. 553-563 (2008).

Roberts M. S. et al.: "Bacillus mojavensis sp. Nov., Distinguishable from Bacillus subtilis by Sexual Isolation, Divergence in DNA Sequence and Differences in Fatty Acid Composition", International Journal of Systematic Bacteriology, vol. 44, No. 2, p. 256-264 (1994).

Sanz Y. et al., "Gut microbiota in obesity and metabolic disorders", Proceedings of the Nutrition Society, vol. 69, No. 3, pp. 434-441 (2010).

Sargent, M.G. "Control of cell length in Bacillus subtilis", Journal of Bacteriology (1975), vol. 123, No. 1, p. 7-19.

Schmidt, S.P. et al. "Reactions between dimanganese, dirhenium, and manganese-rhenium decacarbonyl and oxidants", Inorg. Chim. Acta, vol. 131, No. 2, p. 181-189 (1987).

Schmidt, I. et al. "New concepts of microbial treatment processes for the nitrogen removal in wastewater", FEMS Microbiology Reviews, p. 481-492 (2003).

Schreiber, F. "Detecting and Understanding Nitric Oxide Formation during Nitrogen Cycling in Microbial Biofilms" Dissertation, Universitaet Bremen, Bremen, 154 pages (2009).

Shannon, M.A. et al. "Science and technology for water purification in the coming decades", Nature, vol. 452, p. 301-310 (2008).

Shapleigh, J. "The Denitrifying Prokaryotes", The Prokaryotes, 2, p. 769-792 (2006).

Studies on Screening and Characterization of Microorganisms with high Organic-Pollutants-Degrading Capability from Sea Cucumber (Apostichopus japonicus Selenka) Culture Ponds, 2011, 12 pages. (English abstract included).

Shields et al., "Inactivation of Cryptosporidium parvum under chlorinated recreational water conditions", Journal of Water and Health, vol. 6, p. 513-5210 (2008).

Strous, M. et al. "Missing lithotroph identified as new planctomycete", Nature, vol. 400, p. 446-449 (1999).

(56) References Cited

OTHER PUBLICATIONS

Takemura N. et al., "Inulin Prolongs Survival of Intragastrically Administered Lactobacillus plantarum No. 14 in the Gut of Mice Fed a High-Fat Diet", The Journal of Nutrition, vol. 140, No. 11, p. 1963-1969 (2010).
Third, K.A. et al. "The CANON system (Completely Autotrophic Nitrogen-removal Over Nitrite) under ammonium limitation; Interaction and competition between three groups of bacteria", Systematic and applied microbiology, vol. 24, No. 4, p. 588-596 (2001).
Tramper, J. et al. "Operating performance of Nitrobacter agilis immobilized in carrageenan", Enzyme and Microbial Technology vol. 8, No. 8, p. 477-480 (1986).
Tsilingiri K. et al., "Postbiotics: what else?", Beneficial Microbes, vol. 4, No. 1, p. 101-107 (2013).
Veljkovic et al. "Biodiesel production by ultrasound-assisted transesterification: State of the art and the perspectives" Renewable and Sustainable Energy Reviews, vol. 16, p. 1193-1209 (2012).
Verbaendert, I. et al. "Denitrification is a common feature among members of the genus Bacillus", Syst Appl Microbio vol. 34, No. 5, p. 385-391 (2011).
Wang, Pan et al. "Isolation and immobilization of new aerobic denitrifying bacteria", International Biodeterioration and Biodegradation, vol. 76, p. 12-17 (2012).
Wu et al. "Proliferation culture of Lactobacillus plantarum and preparation of its Concentrated freeze-dried leavening agent" Food and Fermentation Industry, vol. 40, No. 1, 21 pages (2014). (machine translation included).

\* cited by examiner

SEQUENCE LISTING

<160> NUMBER OF SEQ ID NOS: 1

<210> SEQ ID NO 1
<211> LENGTH: 1668
<212> TYPE: DNA
<213> ORGANISM: Bacillus subtilis

<400> SEQUENCE: 1

```
agctcggatc cactagtaac ggccgccagt gtgctggaat tcgcccttag aaaggaggtg    60
atccagccgc accttccgat acggctacct tgttacgact tcaccccaat catctgtccc   120
accttcggcg gctggctcca taaaggttac ctcaccgact tcgggtgtta caaactctcg   180
tggtgtgacg ggcggtgtgt acaaggcccg ggaacgtatt caccgcggca tgctgatccg   240
cgattactag cgattccagc ttcacgcagt cgagttgcag actgcgatcc gaactgagaa   300
cagatttgtg rgattggctt aacctcgcgg tttcgctgcc ctttgttctg tccattgtag   360
cacgtgtgta gcccaggtca taaggggcat gatgatttga cgtcatcccc accttcctcc   420
ggtttgtcac cggcagtcac cttagagtgc ccaactgaat gctggcaact aagatcaagg   480
gttgcgctcg ttgcgggact taacccaaca tctcacgaca cgagctgacg acaaccatgc   540
accacctgtc actctgcccc cgaaggggac gtcctatctc taggattgtc agaggatgtc   600
aagacctggt aaggttcttc gcgttgcttc gaattaaacc acatgctcca ccgcttgtgc   660
gggcccccgt caattccttt gagtttcagt cttgcgaccg tactcccag gcggagtgct   720
taatgcgtta gctgcagcac taaaggggcg gaaacccct aacacttagc actcatcgtt   780
tacggcgtgg actaccaggg tatctaatcc tgttcgctcc ccacgctttc gctcctcagc   840
gtcagttaca gaccagagag tcgccttcgc cactggtgtt cctccacatc tctacgcatt   900
tcaccgctac acgtggaatt ccactctcct cttctgcact caagttcccc agtttccaat   960
gaccctcccc ggttgagccg ggggctttca catcagactt aagaaaccgc ctgcgagccc  1020
tttacgccca ataattccgg acaacgcttg ccacctacgt attaccgcgg ctgctggcac  1080
gtagttagcc gtggctttct ggttaggtac cgtcaaggtg ccgccctatt tgaacgcac  1140
ttgttcttcc ctaacaacag agctttacga tccgaaaacc ttcatcactc acgcggcgtt  1200
gctccgtcag actttcgtcc attgcggaag attccctact gctgcctccc gtaggagtct  1260
gggccgtgtc tcagtcccag tgtggccgat caccctctca ggtcggctac gcatcgtcgc  1320
cttggtgagc cgttacctca ccaactagct aatgcgccgc gggtccatct gtaagtggta  1380
gccgaagcca ccttttatgt ctgaaccatg cggttcagac aaccatccgg tattagcccc  1440
ggtttcccgg agttatccca gtcttacagg caggttaccc acgtgttact cacccgtccg  1500
ccgctaacat cagggagcaa gctcccatct gtccgctcga cttgcatgta ttaggcacgc  1560
cgccagcgtt cgtcctgagc catgaacaaa ctctaagggc gaattctgca gatatccatc  1620
acactggcgg ccgctcgagc atgcatctag agggcccaat cgccctat              1668
```

COMPOSITIONS AND METHODS FOR IMPROVING SURVIVABILITY OF AQUATIC ANIMALS

CROSS-REFERENCE TO RELATED APPLICATIONS

This application claims the benefit of priority to U.S. Provisional Application No. 62/677,372, filed on May 29, 2018, the contents of which are hereby incorporated by reference in their entireties.

INCORPORATION BY REFERENCE OF SEQUENCE LISTING

The contents of the text file named "BIOW-018_SEQ_LISTING.txt", which was created on May 2, 2019 and is 2.5 KB in size, are hereby incorporated by reference in their entireties.

FIELD OF THE INVENTION

The present invention relates to the use of microbial compositions for improving survivability of aquatic animals.

BACKGROUND OF THE INVENTION

Aquaculture is the farming of fish, crustaceans, mollusks, aquatic plants, algae, and other organisms. Aquaculture involves cultivating freshwater and saltwater populations under controlled conditions, and can be contrasted with commercial fishing, which is the harvesting of wild fish. The global aquaculture market was valued at US $176.45 billion in 2017.

There is a need for new compositions and methods for improving the survivability of aquatic animals raised in aquaculture.

SUMMARY OF THE INVENTION

One aspect of the invention relates to a method of raising an aquatic animal in an aquaculture system, the method comprising: (a) contacting the aquaculture system with a water-treatment composition over a first period of time, wherein the water-treatment composition comprises *Bacillus subtilis*, *Bacillus amyloliquefaciens*, *Bacillus licheniformis*, *Bacillus pumilus*, *Bacillus mojavensis*, *Pediococcus acidilactici*, *Pediococcus pentosaceus*, and *Lactobacillus plantarum*; and (b) contacting the aquaculture system with a feed additive composition to feed the aquatic animal over a second period of time, wherein the feed additive composition comprises *Pediococcus acidilactici*, *Pediococcus pentosaceus*, *Lactobacillus plantarum*, and *Bacillus subtilis* 34 KLB.

In some embodiments, the water-treatment composition is in the form of liquid or solid.

In some embodiments, the weight ratio of the *Bacillus subtilis*, *Bacillus amyloliquefaciens*, *Bacillus licheniformis*, *Bacillus pumilus*, and *Bacillus mojavensis* to the *Pediococcus acidilactici*, *Pediococcus pentosaceus*, and *Lactobacillus plantarum* in the water-treatment composition is between 1:10 to 10:1.

In some embodiments, the *Bacillus subtilis*, *Bacillus amyloliquefaciens*, *Bacillus licheniformis*, *Bacillus pumilus*, and *Bacillus mojavensis* in the water-treatment composition are individually aerobically fermented, harvested, freeze-dried, and ground to produce a powder having a mean particle size of about 200 microns, with greater than 60% of the mixture in the size range between 100-800 microns.

In some embodiments, the *Pediococcus acidilactici*, *Pediococcus pentosaceus*, and *Lactobacillus plantarum* in the water-treatment composition are individually aerobically fermented, harvested, freeze-dried, and ground to produce a powder having a mean particle size of about 200 microns, with greater than 60% of the mixture in the size range between 100-800 microns.

In some embodiments, the water-treatment composition further comprises at least 90% of a water-soluble diluent by weight. The water-soluble diluent can be selected from dextrose monohydrate, anhydrous dextrose, sucrose, maltose, maltodextrin, sodium chloride, potassium chloride, calcium chloride, magnesium chloride, sodium sulfate, potassium sulfate, and magnesium sulfate.

In some embodiments, the *Bacillus subtilis* comprises *Bacillus subtilis* 34 KLB.

In some embodiments, the feed additive composition is in the form of liquid or solid.

In some embodiments, the *Pediococcus acidilactici*, *Pediococcus pentosaceus*, *Lactobacillus plantarum*, and *Bacillus subtilis* 34 KLB in the feed additive composition are individually aerobically fermented, harvested, freeze-dried, and ground to produce a powder having a mean particle size of about 200 microns, with greater than 60% of the mixture in the size range between 100-800 microns.

In some embodiments, the weight ratio of *Lactobacillus plantarum*, *Pediococcus pentosaceus*, and *Pediococcus acidilactici* is about 1:1:1.

In some embodiments, the feed additive composition comprises about 0.15% of *Bacillus subtilis* 34 KLB by weight.

In some embodiments, the feed additive composition comprises at least 90% of a water-soluble diluent by weight. The water-soluble diluent can be selected from dextrose monohydrate, anhydrous dextrose, sucrose, maltose, maltodextrin, sodium chloride, potassium chloride, calcium chloride, magnesium chloride, sodium sulfate, potassium sulfate, and magnesium sulfate.

In some embodiments, the aquaculture system is dosed daily with the water-treatment composition. For example, the water-treatment composition can be provided at a dose of about 0.2 ppm to 10 ppm daily.

In some embodiments, the aquaculture system is dosed daily with the feed additive composition. For example, the feed additive composition can be provided at a dose of about 0.5 ppm to 50 ppm daily.

In some embodiments, the first period of time is at least 7 days.

In some embodiments, the second period of time is at least 7 days.

In some embodiments, the weight ratio of the water-treatment composition to the feed additive composition is about 1:1 to 150:1.

In some embodiments, the aquatic animal is shrimp or finfish. When the aquatic animal is finfish, the weight ratio of the water-treatment composition to the feed additive composition can be from 70:1 to 105:1. When the aquatic animal is shrimp, the weight ratio of the water-treatment composition to the feed additive composition is from 1:1 to 2:1 at the hatchery stage.

In some embodiments, the method can increase survivability of the aquatic animal by at least 5% as compared to a control where the water-treatment composition and feed additive composition are not used.

In some embodiments, the method can increase biomass of the aquatic animal by at least 5% as compared to a control where the water-treatment composition and feed additive composition are not used.

In some embodiments, the aquaculture system is contacted simultaneously with the water-treatment composition and the feed additive composition. The water-treatment composition can be sprayed onto the feed additive composition. Alternatively, the water-treatment composition can be added during the production of the feed additive composition.

In some embodiments, prior to step (b), the method further comprises coating or mixing a regular shrimp or fish feed with the feed additive composition.

DETAILED DESCRIPTION OF THE INVENTION

Figure 1:
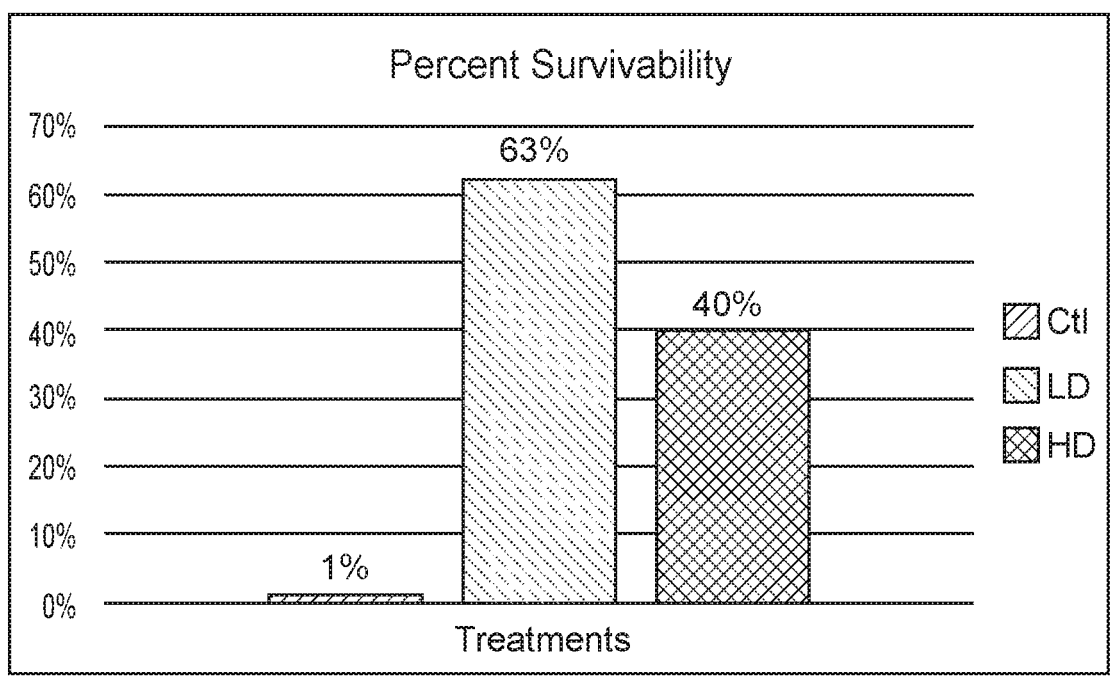
FIG. 1 shows percent survivability of catfish raised according to current best farming practice (control (ctl)) versus catfish raised using the methods described herein. The middle bar (LD) refers to a low dose (500 g/metric ton) of the feed additive composition and the right bar (HD) refers to a high dose (1000 g/metric ton) of the feed additive composition.
Figure 2:
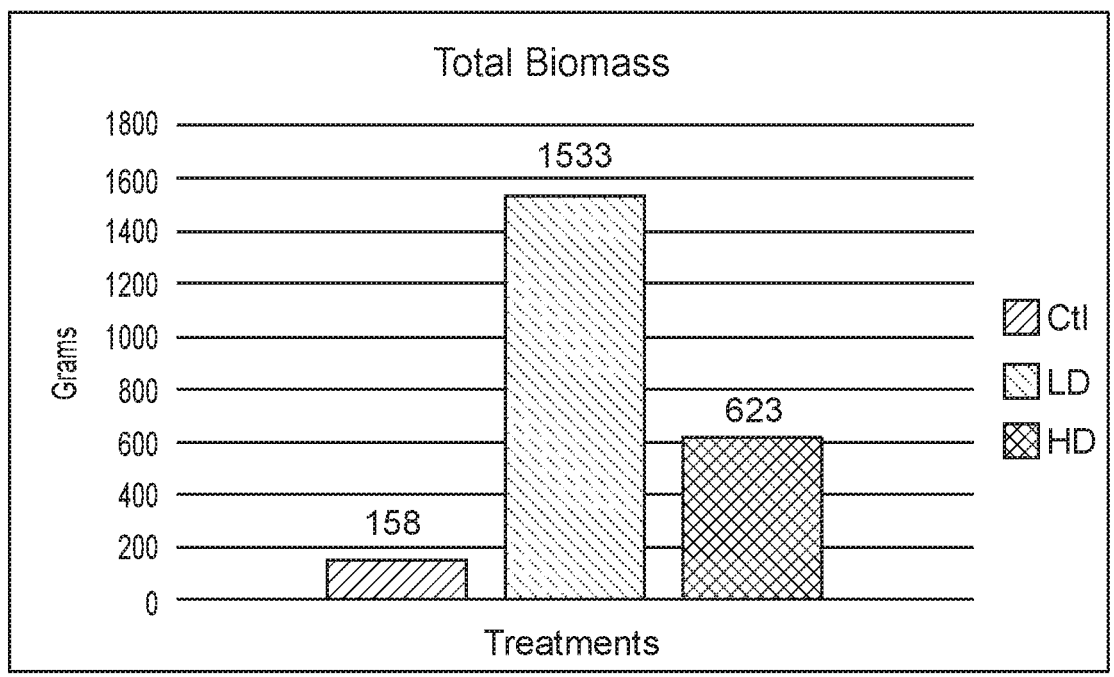
FIG. 2 shows the weight of all surviving catfish from each of the treatments described in FIG. 1.
Figure 3:
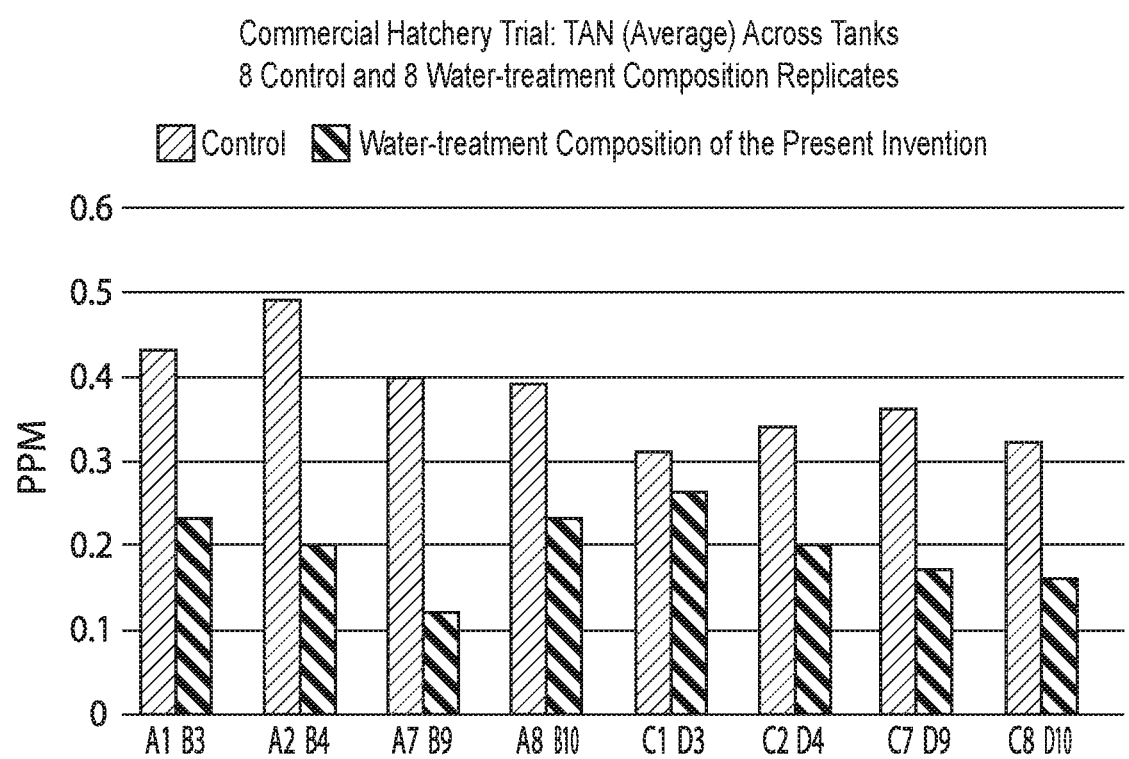
FIG. 3 shows Total Ammonia Nitrogen (TAN) levels in untreated hatchery tanks (control) versus those treated with the water-treatment composition described herein.
Figure 4:
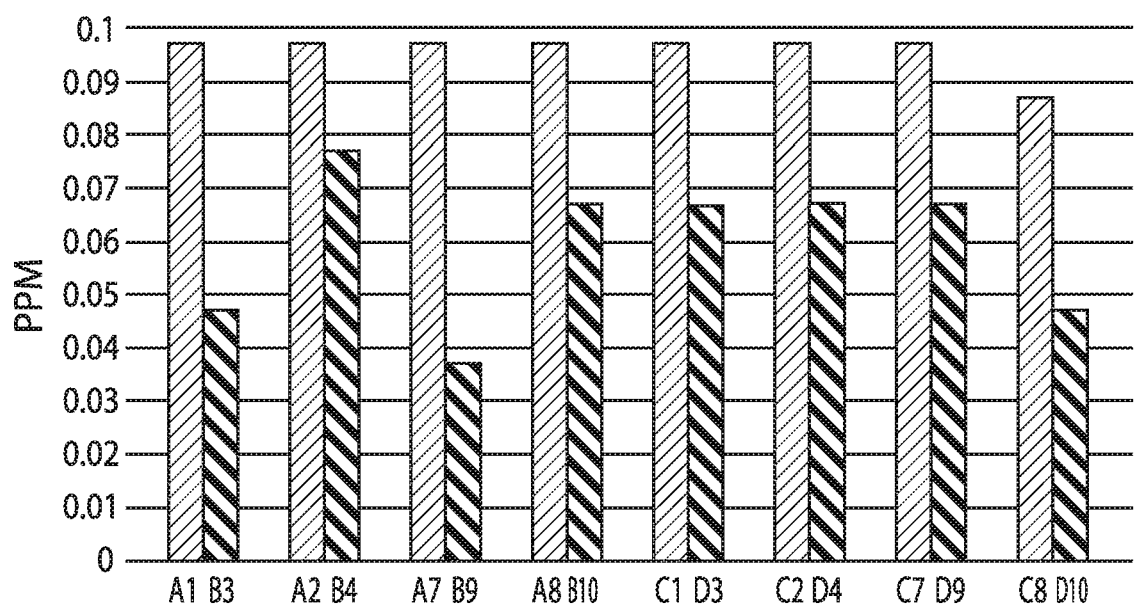
FIG. 4 shows total nitrite levels across the same tanks as described in FIG. 3.

The present disclosure is based, inter alia, on the discovery that the combined use of a water-treatment composition and a feed additive composition can increase the survivability of aquatic animals, where the water-treatment composition includes *Bacillus subtilis, Bacillus amyloliquefaciens, Bacillus licheniformis, Bacillus pumilus, Bacillus mojavensis, Pediococcus acidilactici, Pediococcus pentosaceus*, and *Lactobacillus plantarum*, and the feed additive composition includes *Pediococcus acidilactici, Pediococcus pentosaceus, Lactobacillus plantarum*, and *Bacillus subtilis* 34 KLB.

Accordingly, one aspect of the present disclosure provides a method of raising an aquatic animal in an aquaculture system, the method comprising: (a) contacting the aquaculture system with a water-treatment composition over a first period of time, wherein the water-treatment composition comprises *Bacillus subtilis, Bacillus amyloliquefaciens, Bacillus licheniformis, Bacillus pumilus, Bacillus mojavensis, Pediococcus acidilactici, Pediococcus pentosaceus*, and *Lactobacillus plantarum*; and (b) contacting the aquaculture system with a feed additive composition to feed the aquatic animal over a second period of time, wherein the feed additive composition comprises *Pediococcus acidilactici, Pediococcus pentosaceus, Lactobacillus plantarum*, and *Bacillus subtilis* 34 KLB.

The sequence of *Bacillus subtilis* 34 KLB is shown below.

```
Bacillus subtilis strain 34KLB
                                    (SEQ ID NO.: 1)
AGCTCGGATCCACTAGTAACGGCCGCCAGTGTGCTGGAATTCGCCCTTAG

AAAGGAGGTGATCCAGCCGCACCTTCCGATACGGCTACCTTGTTACGACT
```

```
-continued
TCACCCCAATCATCTGTCCCACCTTCGGCGGCTGGCTCCATAAAGGTTAC

CTCACCGACTTCGGGTGTTACAAACTCTCGTGGTGTGACGGGCGGTGTGT

ACAAGGCCCGGGAACGTATTCACCGCGGCATGCTGATCCGCGATTACTAG

CGATTCCAGCTTCACGCAGTCGAGTTGCAGACTGCGATCCGAACTGAGAA

CAGATTTGTGRGATTGGCTTAACCTCGCGGTTTCGCTGCCCTTTGTTCTG

TCCATTGTAGCACGTGTGTAGCCCAGGTCATAAGGGGCATGATGATTTGA

CGTCATCCCCACCTTCCTCCGGTTTGTCACCGGCAGTCACCTTAGAGTGC

CCAACTGAATGCTGGCAACTAAGATCAAGGGTTGCGCTCGTTGCGGGACT

TAACCCAACATCTCACGACACGAGCTGACGACAACCATGCACCACCTGTC

ACTCTGCCCCCGAAGGGGACGTCCTATCTCTAGGATTGTCAGAGGATGTC

AAGACCTGGTAAGGTTCTTCGCGTTGCTTCGAATTAAACCACATGCTCCA

CCGCTTGTGCGGGCCCCCGTCAATTCCTTTGAGTTTCAGTCTTGCGACCG

TACTCCCCAGGCGGAGTGCTTAATGCGTTAGCTGCAGCACTAAAGGGGCG

GAAACCCCCTAACACTTAGCACTCATCGTTTACGGCGTGGACTACCAGGG

TATCTAATCCTGTTCGCTCCCCACGCTTTCGCTCCTCAGCGTCAGTTACA

GACCAGAGAGTCGCCTTCGCCACTGGTGTTCCTCCACATCTCTACGCATT

TCACCGCTACACGTGGAATTCCACTCTCCTCTTCTGCACTCAAGTTCCCC

AGTTTCCAATGACCCTCCCCGGTTGAGCCGGGGCTTTCACATCAGACTT

AAGAAACCGCCTGCGAGCCCTTTACGCCCAATAAtTCCGGACAACGCTTG

CCACCTACGTATTACCGCGGCTGCTGGCACGTAGTTAGCCGTGGCTTTCT

GGTTAGGTACCGTCAAGGTGCCGCCCTATTTGAACGGCACTTGTTCTTCC

CTAACAACAGAGCTTTACGATCCGAAAACCTTCATCACTCACGCGGCGTT

GCTCCGTCAGACTTTCGTCCATTGCGGAAGATTCCCTACTGCTGCCTCCC

GTAGGAGTCTGGGCCGTGTCTCAGTCCCAGTGTGGCCGATCACCCTCTCA

GGTCGGCTACGCATCGTCGCCTTGGTGAGCCGTTACCTCACCAACTAGCT

AATGCGCCGCGGGTCCATCTGTAAGTGGTAGCCGAAGCCACCTTTTATGT

CTGAACCATGCGGTTCAGACAACCATCCGGTATTAGCCCCGGTTTCCCGG

AGTTATCCCAGTCTTACAGGCAGGTTACCCACGTGTTACTCACCCGTCCG

CCGCTAACATCAGGGAGCAAGCTCCCATCTGTCCGCTCGACTTGCATGTA

TTAGGCACGCCGCCAGCGTTCGTCCTGAGCCATGAACAAACTCTAAGGGC

GAATTCTGCAGATATCCATCACACTGGCGGCCGCTCGAGCATGCATCTAG

AGGGCCCAATCGCCCTAT
```

The water-treatment composition can be in the form of liquid or solid. The water-treatment composition can contain bacteria at a concentration between about $10^6$ and $10^{11}$ colony-forming units (CFUs) per gram. Preferably, the bacteria are at a concentration of at least $10^9$ CFUs per gram. In some embodiments, the bacteria in the water-treatment composition are at a concentration of about $10^9$ to $10^{11}$ CFUs per gram. The bacterial activity or bacterial concentration can be measured by traditional plate counting using agar, such as De Man, Rogosa and Sharpe (MRS) agar.

In some embodiments, the water-treatment composition can be activated by a carbon and/or nitrogen source. Activation of the water-treatment composition can "wake up" the microbes (e.g., *Bacillus*) that are in endospore form, thereby allowing the water-treatment composition to begin working and produce results quicker. In some embodiments, the carbon and/or nitrogen source includes molasses, brown sugar, or a combination thereof. The activation process can further include contacting the water-treatment composition with a base and/or a mineral mix. The base is used to keep the pH neutral for the activation process. In some embodiments, the base is NaHCO$_3$. The mineral mix can provide nutritional supplementation for the activation process. In some embodiments, the mineral mix includes dipotassium phosphate, calcium proprionate, manganese glycinate, selenium salt, iron glycinate, copper glycinate, zinc glycinate, cobalt chloride, or a combination thereof. In some embodiments, the mineral mix includes about 64% dipotassium phosphate by weight, about 20% calcium proprionate by weight, about 4.5% manganese glycinate by weight, about 2.7% selenium salt by weight, about 3.1% iron glycinate by weight, about 2.8% copper glycinate by weight, about 2.7% zinc glycinate by weight, and about 0.08% cobalt chloride by weight.

In some embodiments of the water-treatment composition, the weight ratio of the *Bacillus subtilis*, *Bacillus amyloliquefaciens*, *Bacillus licheniformis*, *Bacillus pumilus*, and *Bacillus mojavensis* to the *Pediococcus acidilactici*, *Pediococcus pentosaceus*, and *Lactobacillus plantarum* is between 1:10 to 10:1. For example, the weight ratio of the *Bacillus subtilis*, *Bacillus amyloliquefaciens*, *Bacillus licheniformis*, *Bacillus pumilus*, and *Bacillus mojavensis* to the *Pediococcus acidilactici*, *Pediococcus pentosaceus*, and *Lactobacillus plantarum* can be about 1:10, 1:9, 1:8, 1:7, 1:6, 1:5, 1:4, 1:3, 1:2, 1:1, 2:1, 3:1, 4:1, 5:1, 6:1, 7:1, 8:1, 9:1, or 10:1.

In some embodiments of the water-treatment composition, the *Bacillus subtilis* can include *Bacillus subtilis* 34 KLB.

In some embodiments, the water-treatment composition can include about 0.1% to 10% of *Bacillus subtilis* by weight, e.g., about 0.1%, 0.2%, 0.3%, 0.4%, 0.5%, 0.6%, 0.7%, 0.8%, 0.9%, 1%, 2%, 3%, 4%, 5%, 6%, 7%, 8%, 9%, or 10% by weight. For example, the water-treatment composition can include about 0.1% to 9%, 0.1% to 8%, 0.1% to 7%, 0.1% to 6%, 0.1% to 5%, 1% to 5%, 1% to 6%, 1% to 7%, 1% to 8%, 1% to 9%, or 1% to 10% of *Bacillus subtilis* by weight.

In some embodiments, the water-treatment composition can include about 0.1% to 10% of *Bacillus amyloliquefaciens* by weight, e.g., about 0.1%, 0.2%, 0.3%, 0.4%, 0.5%, 0.6%, 0.7%, 0.8%, 0.9%, 1%, 2%, 3%, 4%, 5%, 6%, 7%, 8%, 9%, or 10% by weight. For example, the water-treatment composition can include about 0.1% to 9%, 0.1% to 8%, 0.1% to 7%, 0.1% to 6%, 0.1% to 5%, 1% to 5%, 1% to 6%, 1% to 7%, 1% to 8%, 1% to 9%, or 1% to 10% of *Bacillus amyloliquefaciens* by weight.

In some embodiments, the water-treatment composition can include about 0.1% to 10% of *Bacillus licheniformis* by weight, e.g., about 0.1%, 0.2%, 0.3%, 0.4%, 0.5%, 0.6%, 0.7%, 0.8%, 0.9%, 1%, 2%, 3%, 4%, 5%, 6%, 7%, 8%, 9%, or 10% by weight. For example, the water-treatment composition can include about 0.1% to 9%, 0.1% to 8%, 0.1% to 7%, 0.1% to 6%, 0.1% to 5%, 1% to 5%, 1% to 6%, 1% to 7%, 1% to 8%, 1% to 9%, or 1% to 10% of *Bacillus licheniformis* by weight.

In some embodiments, the water-treatment composition can include about 0.1% to 10% of *Bacillus pumilus* by weight, e.g., about 0.1%, 0.2%, 0.3%, 0.4%, 0.5%, 0.6%, 0.7%, 0.8%, 0.9%, 1%, 2%, 3%, 4%, 5%, 6%, 7%, 8%, 9%, or 10% by weight. For example, the water-treatment composition can include about 0.1% to 9%, 0.1% to 8%, 0.1% to 7%, 0.1% to 6%, 0.1% to 5%, 1% to 5%, 1% to 6%, 1% to 7%, 1% to 8%, 1% to 9%, or 1% to 10% of *Bacillus pumilus* by weight.

In some embodiments, the water-treatment composition can include about 0.1% to 10% of *Bacillus mojavensis* by weight, e.g., about 0.1%, 0.2%, 0.3%, 0.4%, 0.5%, 0.6%, 0.7%, 0.8%, 0.9%, 1%, 2%, 3%, 4%, 5%, 6%, 7%, 8%, 9%, or 10% by weight. For example, the water-treatment composition can include about 0.1% to 9%, 0.1% to 8%, 0.1% to 7%, 0.1% to 6%, 0.1% to 5%, 1% to 5%, 1% to 6%, 1% to 7%, 1% to 8%, 1% to 9%, or 1% to 10% of *Bacillus mojavensis* by weight.

In some embodiments, the water-treatment composition can include about 0.1% to 10% of *Pediococcus acidilactici* by weight, e.g., about 0.1%, 0.2%, 0.3%, 0.4%, 0.5%, 0.6%, 0.7%, 0.8%, 0.9%, 1%, 2%, 3%, 4%, 5%, 6%, 7%, 8%, 9%, or 10% by weight. For example, the water-treatment composition can include about 0.1% to 9%, 0.1% to 8%, 0.1% to 7%, 0.1% to 6%, 0.1% to 5%, 1% to 5%, 1% to 6%, 1% to 7%, 1% to 8%, 1% to 9%, or 1% to 10% of *Pediococcus acidilactici* by weight.

In some embodiments, the water-treatment composition can include about 0.1% to 10% of *Pediococcus pentosaceus* by weight, e.g., about 0.1%, 0.2%, 0.3%, 0.4%, 0.5%, 0.6%, 0.7%, 0.8%, 0.9%, 1%, 2%, 3%, 4%, 5%, 6%, 7%, 8%, 9%, or 10% by weight. For example, the water-treatment composition can include about 0.1% to 9%, 0.1% to 8%, 0.1% to 7%, 0.1% to 6%, 0.1% to 5%, 1% to 5%, 1% to 6%, 1% to 7%, 1% to 8%, 1% to 9%, or 1% to 10% of *Pediococcus pentosaceus* by weight.

In some embodiments, the water-treatment composition can include about 0.1% to 10% of *Lactobacillus plantarum* by weight, e.g., about 0.1%, 0.2%, 0.3%, 0.4%, 0.5%, 0.6%, 0.7%, 0.8%, 0.9%, 1%, 2%, 3%, 4%, 5%, 6%, 7%, 8%, 9%, or 10% by weight. For example, the water-treatment composition can include about 0.1% to 9%, 0.1% to 8%, 0.1% to 7%, 0.1% to 6%, 0.1% to 5%, 1% to 5%, 1% to 6%, 1% to 7%, 1% to 8%, 1% to 9%, or 1% to 10% of *Lactobacillus plantarum* by weight.

The water-treatment composition can further include at least 80% of an inert carrier by weight. For example, the water-treatment composition can include at least 80%, 85%, 90%, 91%, 92%, 93%, 94%, 95%, 96%, 97%, 98%, or 99% of the inert carrier by weight. An inert carrier includes for example, anhydrous dextrose, dextrose monohydrate, maltodextrin, dendritic salt, rice bran, wheat bran, oat bran, soybean meal, rice hulls, or a mixture thereof. In some embodiments, the inert carrier can be a water-soluble diluent. Examples of the water-soluble diluents include, but are not limited to, dextrose monohydrate, anhydrous dextrose, sucrose, maltose, maltodextrin, sodium chloride, potassium chloride, calcium chloride, magnesium chloride, sodium sulfate, potassium sulfate, and magnesium sulfate. In some embodiments, the inert carrier is dextrose monohydrate. In some embodiments, the inert carrier is anhydrous dextrose.

In some embodiments, the water-treatment composition can include about 0.1% to 1% of *Bacillus subtilis* by weight, about 0.1% to 1% of *Bacillus amyloliquefaciens* by weight, about 0.1% to 1% of *Bacillus licheniformis* by weight, about 0.1% to 1% of *Bacillus pumilus* by weight, about 0.1% to 1% of *Bacillus mojavensis* by weight, about 1% to 5% of *Pediococcus acidilactici* by weight, about 1% to 5% of *Pediococcus pentosaceus* by weight, and about 1% to 5% of *Lactobacillus plantarum* by weight.

In some embodiments, the water-treatment composition can include about 0.2% of *Bacillus subtilis* by weight, about 0.6% of *Bacillus amyloliquefaciens* by weight, about 0.3% of *Bacillus licheniformis* by weight, about 0.6% of *Bacillus pumilus* by weight, about 0.3% of *Bacillus mojavensis* by weight, about 0.1% of *Bacillus subtilis* 34 KLB by weight, about 3.3% of *Pediococcus acidilactici* by weight, about 3.3% of *Pediococcus pentosaceus* by weight, and about 3.3% of *Lactobacillus plantarum* by weight. Optionally, the water-treatment composition can include about 87.9% of dextrose monohydrate by weight.

The water-treatment composition can reduce the level of total ammonia nitrogen (TAN) and/or the level of nitrite.

The feed additive composition can be in the form of liquid or solid. The feed additive composition can contain bacteria at a concentration between about $10^6$ and $10^{11}$ CFUs per gram. Preferably, the bacteria in the feed additive composition are at a concentration of at least $10^9$ CFUs per gram. In some embodiments, the bacteria are at a concentration of about $10^9$ to $10^{11}$ CFUs per gram. Lactic acid counts can be obtained on MRS agar. *Bacillus* counts can be obtained on Trypticase soy agar.

In some embodiments, the feed additive composition can further include a component that has nutritional values to the aquatic animal.

Prior to contacting the feed additive composition with the aquaculture system, the feed additive composition can be mixed with or coated onto regular animal feed, e.g., shrimp feed or fish feed. In some embodiments, the feed additive composition can be mixed with or coated onto regular shrimp feed or fish feed at a weight ratio from about 1:10,000 to 1:1,000.

The feed additive composition and the regular shrimp feed or fish feed can also be used as two separate compositions. For example, the methods described herein can further comprising contacting the aquaculture system with a regular shrimp feed or fish feed.

In some embodiments, the feed additive composition can include about 1%, 2%, 3%, 4%, 5%, 6%, 7%, 8%, 9%, 10%, 15%, 20%, 25% or more by weight of a mixture comprising *Pediococcus acidilactici, Pediococcus pentosaceus*, and *Lactobacillus plantarum*. The feed additive composition can further include about 0.1%, 0.15%, 0.2%, 0.3%, 0.4%, 0.5%, 0.6%, 0.7%, 0.8%, 0.9%, 1%, 2%, 3%, 4%, 5% or 10% or more of *Bacillus subtilis* 34 KLB by weight.

In some embodiments, the feed additive composition can include 0.1% to 10% of *Pediococcus acidilactici* by weight, e.g., 0.1%, 0.2%, 0.3%, 0.4%, 0.5%, 0.6%, 0.7%, 0.8%, 0.9%, 1%, 2%, 3%, 4%, 5%, 6%, 7%, 8%, 9%, or 10% by weight. For example, the feed additive composition can include about 0.1% to 9%, 0.1% to 8%, 0.1% to 7%, 0.1% to 6%, 0.1% to 5%, 1% to 5%, 1% to 6%, 1% to 7%, 1% to 8%, 1% to 9%, or 1% to 10% of *Pediococcus acidilactici* by weight.

In some embodiments, the feed additive composition can include 0.1% to 10% of *Pediococcus pentosaceus* by weight, e.g., 0.1%, 0.2%, 0.3%, 0.4%, 0.5%, 0.6%, 0.7%, 0.8%, 0.9%, 1%, 2%, 3%, 4%, 5%, 6%, 7%, 8%, 9%, or 10% by weight. For example, the feed additive composition can include about 0.1% to 9%, 0.1% to 8%, 0.1% to 7%, 0.1% to 6%, 0.1% to 5%, 1% to 5%, 1% to 6%, 1% to 7%, 1% to 8%, 1% to 9%, or 1% to 10% of *Pediococcus pentosaceus* by weight.

In some embodiments, the feed additive composition can include 0.1% to 10% of *Lactobacillus plantarum* by weight, e.g., 0.1%, 0.2%, 0.3%, 0.4%, 0.5%, 0.6%, 0.7%, 0.8%, 0.9%, 1%, 2%, 3%, 4%, 5%, 6%, 7%, 8%, 9%, or 10% by weight. For example, the feed additive composition can include about 0.1% to 9%, 0.1% to 8%, 0.1% to 7%, 0.1% to 6%, 0.1% to 5%, 1% to 5%, 1% to 6%, 1% to 7%, 1% to 8%, 1% to 9%, or 1% to 10% of *Lactobacillus plantarum* by weight.

In some embodiments, the feed additive composition can include 0.05% to 10% of *Bacillus subtilis* 34 KLB by weight, e.g., 0.05%, 0.1%, 0.2%, 0.3%, 0.4%, 0.5%, 0.6%, 0.7%, 0.8%, 0.9%, 1%, 2%, 3%, 4%, 5%, 6%, 7%, 8%, 9%, or 10% by weight. For example, the feed additive composition can include about 0.05% to 9%, 0.05% to 8%, 0.05% to 7%, 0.05% to 6%, 0.05% to 5%, 0.1% to 9%, 0.1% to 8%, 0.1% to 7%, 0.1% to 6%, 0.1% to 5%, 1% to 5%, 1% to 6%, 1% to 7%, 1% to 8%, 1% to 9%, or 1% to 10% of *Bacillus subtilis* 34 KLB by weight.

The feed additive composition can further include at least 80% of an inert carrier by weight. For example, the feed additive composition can include at least 80%, 85%, 90%, 91%, 92%, 93%, 94%, 95%, 96%, 97%, 98%, or 99% of the inert carrier by weight. In some embodiments, the inert carrier can be a water-soluble diluent.

In some embodiments, the feed additive composition can include about 0.1% to 10% by weight of a mixture comprising *Pediococcus acidilactici, Pediococcus pentosaceus*, and *Lactobacillus plantarum*, where each of the bacteria is present in the mixture in equal amounts by weight, and about 0.05% to 5% of *Bacillus subtilis* 34 KLB by weight.

In some embodiments, the feed additive composition can include about 2% by weight of a mixture comprising *Pediococcus acidilactici, Pediococcus pentosaceus*, and *Lactobacillus plantarum*, where each of the bacteria is present in the mixture in equal amounts by weight, and 0.15% of *Bacillus subtilis* 34 KLB by weight. Optionally, the feed additive composition can further include about 97.85% of rice bran or Nutri-Sure by weight.

In some embodiments, the feed additive composition can include about 0.40% by weight of a mixture comprising *Pediococcus acidilactici, Pediococcus pentosaceus*, and *Lactobacillus plantarum*, where each of the bacteria is present in the mixture in equal amounts by weight, and 0.15% of *Bacillus subtilis* 34 KLB by weight. Optionally, the feed additive composition can further include about 93.85% of dextrose monohydrate by weight and 4% of diatomaceous earth by weight.

The bacteria in either the water-treatment composition or the feed additive composition can be produced using any standard fermentation process known in the art, such as solid substrate or submerged liquid fermentation. The fermented cultures can be mixed cultures, microbiotic composites, or single isolates. The probiotic lactic acid bacteria can be anaerobically fermented. In some embodiments, the bacteria are anaerobically fermented in the presence of carbohydrates. Suitable carbohydrates include inulin, fructo-oligosaccharide, and gluco-oligosaccharides.

After fermentation, the bacteria are harvested by any known methods in the art. For example, the bacteria are harvested by filtration or centrifugation, or simply supplied as the ferment. The bacteria can be dried by any method known in the art. For example, the bacteria can be dried by liquid nitrogen followed by lyophilization. The compositions according to the present disclosure are freeze dried to moisture content less than 20%, 15%, 10%, 9%, 8%, 7%, 6%, 5%, 4%, 3%, 2%, or 1% by weight. In some embodiments, the compositions according to the invention have been freeze dried to moisture content less than 5% by weight. In some embodiments, the freeze-dried powder is ground to decrease the particle size. The bacteria are ground by conical grinding at a temperature less than 10° C., 9° C., 8° C., 7° C., 6° C., 5° C., 4° C., 3° C., 2° C., 1° C., or 0° C.

Preferably, the temperature is less than 4° C. For example, the particle size is less than 1500, 1400, 1300, 1200, 1100, 1000, 900, 800, 700, 600, 500, 400, 300, 200, or 100 microns. Preferably, the freeze-dried powder is ground to decrease the particle size such that the particle size is less than 800 microns. Most preferred are particle sizes less than about 400 microns. In most preferred embodiments, the dried powder has a mean particle size of 200 microns, with 60% or more of the mixture in the size range between 100-800 microns. The particle size can be measured using sieving according to ANSI/ASAE 5319.4 method.

In some embodiments of the water-treatment composition, the *Bacillus subtilis, Bacillus amyloliquefaciens, Bacillus licheniformis, Bacillus pumilus, Bacillus mojavensis, Pediococcus acidilactici, Pediococcus pentosaceus,* and *Lactobacillus plantarum* are individually aerobically fermented, harvested, freeze-dried, and ground to produce a powder having a mean particle size of about 200 microns, with greater than 60% of the mixture in the size range between 100-800 microns.

In some embodiments of the feed additive composition, the *Pediococcus acidilactici, Pediococcus pentosaceus, Lactobacillus plantarum,* and *Bacillus subtilis* 34 KLB are individually aerobically fermented, harvested, freeze-dried, and ground to produce a powder having a mean particle size of about 200 microns, with greater than 60% of the mixture in the size range between 100-800 microns.

The water-treatment composition can be added to the aquaculture system once a day, several times a day (e.g., 2, 3, 4, or more), or once every few days (e.g., once a week). In some embodiments, the water-treatment composition is provided at a dose of about 0.1 ppm to 50 ppm daily, e.g., about 0.1 ppm to 40 ppm daily, about 0.1 ppm to 30 ppm daily, or about 0.2 ppm to 10 ppm daily. In some embodiments, the water-treatment composition is provided at a dose of about 0.2 ppm daily, about 1 ppm daily, about 2 ppm daily, about 3 ppm daily, about 4 ppm daily, about 5 ppm daily, about 6 ppm daily, about 7 ppm daily, about 8 ppm daily, about 9 ppm daily, or about 10 ppm daily.

The water-treatment composition can be added to the aquaculture system for as long as needed. Treatments in accordance with the present disclosure can include an initial assessment of the aquaculture system. Various characteristics may be measured, observed and/or established as part of the treatment process. Suitable characteristics of treatment water can include, but are not limited to, transparency, water temperature, pH, dissolved oxygen, salinity, electrical conductivity, total alkalinity, hardness, total ammonia, nitrite, and/or nitrate. Accordingly, the duration of using the water-treatment composition can depend on one or more of the above characteristics. The water-treatment composition can be added to the aquaculture system for a period of time of at least 7 days, e.g., a week or more, two weeks or more, three weeks or more, four weeks or more. Water and sediment can also be sampled to determine the level of *vibrio* bacteria (low level of *vibrio* bacteria is preferred). Water quality can be monitored over time.

The feed additive composition can be added to the aquaculture system once a day, several times a day (e.g., 2, 3, 4, or more), or once every few days (e.g., once a week). In some embodiments, the feed additive composition is provided at a dose of about 0.5 ppm to 100 ppm daily, e.g., about 0.5 ppm to 80 ppm daily, about 0.5 ppm to 50 ppm daily, about 2 ppm to 60 ppm daily, or about 2 ppm to 50 ppm daily. The dosage can depend on the type of the aquatic animal and/or the growth stage. In some embodiments, the feed additive composition is provided at a dose of about 2 ppm daily, 5 ppm daily, 10 ppm daily, 15 ppm daily, 20 ppm daily, 25 ppm daily, 30 ppm daily, 35 ppm daily, 40 ppm daily, 45 ppm daily, or 50 ppm daily.

The feed additive composition can be added to the aquaculture system for as long as needed. The feed additive composition can be added to the aquaculture system for a period of at least 7 days, e.g., a week or more, two weeks or more, three weeks or more, four weeks or more.

In some embodiments, the aquaculture system can be contacted simultaneously with the water-treatment composition and the feed additive composition. In such instance, the water-treatment composition and the feed additive composition can be two different compositions. Alternatively, the water-treatment composition can be sprayed onto the feed additive composition. The water-treatment composition can also be added during the production of the feed additive composition. In some embodiments, the aquaculture system can be contacted with the water-treatment composition prior to the feed additive composition. In some embodiments, the aquaculture system can be contacted with the water-treatment composition after the feed additive composition.

For a given day, the weight ratio of the water-treatment composition to the feed additive composition is about 1:1 to 150:1, depending on the type of the aquatic animal. The weight ratio of the water-treatment composition to the feed additive composition can be about 1:1 to 140:1, 1:1 to 130:1, 1:1 to 120:1, 1:1 to 110:1, 10:1 to 140:1, 10:1 to 130:1, 10:1 to 120:1, 10:1 to 110:1, 50:1 to 140:1, 50:1 to 130:1, 50:1 to 120:1, or 50:1 to 110:1. For example, when the aquatic animal is finfish, the weight ratio of the water-treatment composition to the feed additive composition can be from 70:1 to 105:1. When the aquatic animal is shrimp, the weight ratio of the water-treatment composition to the feed additive composition can be from 1:1 to 2:1 at the hatchery stage.

The methods disclosed herein can be used for aquaculture systems including, but not limited to, a pond, a pool, a lagoon, an estuary, and an enclosed area in the ocean. The methods disclosed herein can improve the survivability of any organism suitable for aquaculture including, but not limited to, fish (e.g., crayfish, bottom dwelling fish, or finfish), shrimp, lobster, prawns, oysters, mussels, cockles, mollusks, and urchins.

In some embodiments, the method can increase survivability of the aquatic animal by at least 5% as compared to a control where the water-treatment composition and feed additive composition are not used. In some embodiments, the method can increase survivability of the aquatic animal by at least 6%, at least 7%, at least 8%, at least 9%, at least 10%, at least 20%, at least 30%, at least 40%, or at least 50% as compared to a control where the water-treatment composition and feed additive composition are not used. In some embodiments, the method can increase survivability of the aquatic animal by about 10% to 200% as compared to a control where the water-treatment composition and feed additive composition are not used.

In some embodiments, the method can increase biomass of the aquatic animal by at least 5% as compared to a control where the water-treatment composition and feed additive composition are not used. In some embodiments, the method can increase biomass of the aquatic animal by at least 6%, at least 7%, at least 8%, at least 9%, at least 10%, at least 20%, at least 30%, at least 40%, or at least 50% as compared to a control where the water-treatment composition and feed additive composition are not used. In some embodiments, the method can increase biomass of the aquatic animal by about 10% to 200% as compared to a control where the water-treatment composition and feed additive composition are not used.

The details of the invention are set forth in the accompanying description below. Although methods and materials similar or equivalent to those described herein can be used in the practice or testing of the present invention, illustrative methods and materials are now described. Other features, objects, and advantages of the invention will be apparent from the description and from the claims. In the specification and the appended claims, the singular forms also include the plural unless the context clearly dictates otherwise. Unless defined otherwise, all technical and scientific terms used herein have the same meaning as commonly understood by one of ordinary skill in the art to which this invention belongs. All patents and publications cited in this specification are incorporated herein by reference in their entireties.

DEFINITIONS

The term "comprising" as used herein is synonymous with "including" or "containing" and is inclusive or open-ended and does not exclude additional, unrecited members, elements or method steps. By "consisting of" is meant including, and limited to, whatever follows the phrase "consisting of." Thus, the phrase "consisting of" indicates that the listed elements are required or mandatory, and that no other elements may be present. By "consisting essentially of" is meant including any elements listed after the phrase and limited to other elements that do not interfere with or contribute to the activity or action specified in the disclosure for the listed elements. Thus, the phrase "consisting essentially of" indicates that the listed elements are required or mandatory, but that other elements are optional and may or may not be present depending upon whether or not they materially affect the activity or action of the listed elements.

The articles "a" and "an" are used in this disclosure to refer to one or more than one (i.e., to at least one) of the grammatical object of the article. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" may refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of" "only one of" or "exactly one of" "Consisting essentially of," when used in the claims, shall have its ordinary meaning as used in the field of patent law.

The term "about" means within ±10% of a given value or range.

The claims should not be read as limited to the described order or elements unless stated to that effect. It should be understood that various changes in form and detail may be made by one of ordinary skill in the art without departing from the spirit and scope of the appended claims. All embodiments that come within the spirit and scope of the following claims and equivalents thereto are claimed.

EXAMPLES

The disclosure is further illustrated by the following examples, which are not to be construed as limiting this disclosure in scope or spirit to the specific procedures herein described. It is to be understood that the examples are provided to illustrate certain embodiments and that no limitation to the scope of the disclosure is intended thereby. It is to be further understood that resort may be had to various other embodiments, modifications, and equivalents thereof which may suggest themselves to those skilled in the art without departing from the spirit of the present disclosure and/or scope of the appended claims.

Example 1. Growth Performance Study in Catfish

Eggs are collected and taken to an SPF facility where they are disinfected per standard protocol. Upon hatch, the fry will begin to eat a commercial diet. Fry are kept in tanks for 30 days post-hatch before pond stocking. Fry are stocked into three tanks for treatment as detailed below.

Tank 1. Control Feed (no microbial additive products).

Tank 2. The feed additive composition of the present invention is coated onto feed at 500 g/mT equivalent. The water-treatment composition of the present invention is added directly to the tank water at the equivalent final concentration of 5 mg/L daily.

Tank 3. The feed additive composition of the present invention is coated onto feed at 1000 g/mT equivalent. The water-treatment composition of the present invention is added directly to the tank water at the equivalent final concentration of 15 mg/L daily.

Grow out parameters: stock catfish fingerlings and proceed with feeding and grow out regimen per Mississippi State University standard stocking and feed protocols. Ponds are $\frac{1}{10}$-acre, 4 net pens per pond (replicates). Stocking density: 1000 fry/net pen (Length of study—grow out 4 months).

Grow out treatments with disease challenge: Fry are acclimated to ponds for 2 months prior to challenge. There are 4 net pens per treatment for pre-challenge measurements and 4 net pens per treatment for post-challenge measurements.

Growth portion: 1. Control feed (no microbial products) pond. 2. The feed additive composition of the present invention is coated onto feed at the equivalent of 500 g per metric ton of feed. The water-treatment composition of the present invention is added to the pond water at the equivalent, final concentration of 1 kg/Ha/week ($\frac{1}{10}$ acre=0.04047 Ha=404.7 m$^2$). 3. The feed composition of the present invention is coated onto feed at the equivalent of 1000 g per metric ton of feed. Water-treatment composition of the present invention is added to the pond water at the equivalent, final concentration of 1 kg/Ha/week (1/10 acre=0.04047 Ha=404.7 m²).

For Disease Challenge: Treatment 3 remains the same except for the addition of an additional commercial probiotic composition as follows: (1) Feed coating: The feed additive composition of the present invention and the commercial probiotic are coated onto floating feed. The feed additive composition is coated at the equivalent of 1 kg/mT of feed and the commercial probiotic is coated at 50 grams per metric ton of feed; and (2) Water addition: The water-treatment composition is added to the pond water at the equivalent, final concentration of 1 kg/Ha/week and the commercial probiotic is added to the pond water at the equivalent final concentration of 150 g/Ha/week.

Growth period: Control and treatment catfish are grown to a size per model system.

During grow out period, catfish health and water quality are evaluated at regular intervals to ensure healthy production. For water quality, total ammonia, nitrite, and pH are monitored weekly. For catfish health, catfish are assessed prior to disease challenge and after challenge for the following: average weight gain (AWG), specific growth rate (SGR), feed conversion ratio (FCR), survival rate. For *Edwardsiella ictaluri* resistance, histological parameters (vacuolation (individual cell swelling) of small, large intestine) are measured.

Example 2. Protocol for Coating the Feed Additive Composition of the Present Invention onto Floating Fish Feed Step 1. Make sure all the equipment is clean and thoroughly dry.

Step 2. Weigh out 1 kg of the feed to be coated minus the amount of feed additive composition and water that will be used to coat.

Step 3. When coating 500 grams/mT feed equivalent: (i) Weigh out 5 grams of the feed additive composition. (ii) Measure out 120 mL of DI water. (iii) Add the 5 grams of feed additive composition into the 120 mL of DI water and mix thoroughly using a blender, stirring mixer, or stir plate with stir bar. Once mixing is complete transfer this solution to the spraying unit. (iv) Each kg of feed to be coated will receive 12 mL of the solution from step (iii). 1000 grams Feed−12 grams Coating=988 grams of Feed needed. (v) Add the required amount of feed to be coated to the feed mixer. (vi) With the feed mixer on, begin spraying the solution containing the feed additive composition onto the feed bed. Avoid spraying onto mixer blades and mixer walls. Constant shaking of the spray unit is recommended to keep undissolved solids dispersed. It is critical to monitor the amount of spray-on. This can be done volumetrically—by monitoring the reduction in liquid volume from the spray system, or gravimetrically—by measuring weight loss of the spray system. (vii) Once coating is complete (12 mL solution onto 988 grams of feed), turn off the mixer and spread the coated feed onto a drying screen or aluminum foil and allow to air dry for 30 minutes.

Alternatively, when coating 1000 grams/mT feed equivalent: (i) Weigh out 10 grams of the feed additive composition. (ii) Measure out 120 mL of DI water. (iii) Add the 10 grams of feed additive composition into the 120 mL of DI water and mix thoroughly using the blender, stirring mixer or stir plate with stir bar. Once mixing is complete, transfer this solution to the spraying unit. (iv) Each kg of feed to be coated will receive 12 mL of the solution from step (iii). 1000 grams Feed−12 grams Coating=988 grams of Feed needed. (v) Add the required amount of feed to be coated to the feed mixer. (vi) With the feed mixer on, begin spraying the solution of feed additive composition onto the feed bed. Avoid spraying onto mixer blades and walls of the mixer. Constant shaking of the spray unit is recommended to keep undissolved solids dispersed. It is important to monitor the amount of spray-on. This can be done volumetrically—by monitoring the reduction in liquid volume from the spray system, or gravimetrically—by measuring weight loss of the spray system. (vii) Once coating is complete (12 mL solution onto 988 grams of feed), turn off the mixer and spread the coated feed onto a drying screen or aluminum foil and allow to air dry for 30 minutes.

Note: Coating can also be done by spreading the feed out as a single layer onto a clean tray (plastic or metal) then spraying the feed additive composition solution uniformly over the surface of the feed until the feed appears shiny and wet. With gloved hands, turn the feed over several times to mix, spread out evenly across the pan, and continue coating.

Example 3. Protocol for Coating 1 kg of Fish Feed with the Feed Additive Composition of the Present Invention and the Commercial Probiotic Step 1. Make sure all the equipment is clean and thoroughly dry.

Step 2. Weigh out 1 kg of the feed to be coated minus the amount of feed additive composition and water that will be used to coat.

Step 3. When coating 1000 grams/mT and 50 grams of the commercial probiotic/mT feed equivalent: (i) Weigh out 100 grams of the feed additive composition of the present invention and 5 grams of the commercial probiotic. (ii) Measure out 1.2 Liters of DI Water. (iii) Add the 100 grams of the microbial mixture of the present invention and 5 grams of the commercial probiotic into the 1.20 L of DI water and mix thoroughly using the blender, mixing stirrer, or stir plate with stir bar. Once mixing is complete, transfer this solution to the spraying unit. (iv) Each kg of feed to be coated will receive 12 mL of the solution from step (iii). 1000 grams Feed−12 grams coating=988 grams of feed needed. (v) Add the required amount of feed to be coated to the feed mixer. (vi) With the feed mixer on, begin spraying the microbial feed additive solution onto the feed bed. Avoid spraying onto mixer blades and walls of the mixer. Constant shaking of the spray unit is recommended to keep undissolved solids dispersed. It is important to monitor the amount of spray-on. This can be done volumetrically—by monitoring the reduction in liquid volume from the spray system, or gravimetrically—by measuring weight loss of the spray system. (vii) Once coating is complete (12 mL solution onto 988 grams of feed), turn off the mixer and spread the coated feed onto a drying screen or aluminum foil and allow to air dry for 30 minutes.

Note: Coating can also be done by spreading the feed out as a single layer onto a clean tray (plastic or metal), then spraying the microbial feed additive solution uniformly over the surface of the feed until the feed appears shiny and wet. With gloved hands, turn the feed over several times to mix, spread out evenly across the pan, and continue coating.

Example 4. General Aquaculture Protocol for Vannamei Shrimp (1) Hatchery Protocol: Broodstock are Certified SPF. All broodstock fresh feed is tested to be free of green *Vibrio* bacteria, diseases (Vibriosis, EMS, WSSV, and EHP), and low in levels of yellow *Vibrio* bacteria.

For broodstock, use 10 grams of the feed additive composition of the present invention for 1 kg of fresh feed. Add the mixed feed to the broodstock tank within 20 minutes of making.

Broodstock tanks and water should be clean. The broodstock tanks are tested to confirm they are also free of green *Vibrio* bacteria, diseases and low in levels of yellow *Vibrio* bacteria. Add 2 mg/day of the water-treatment composition of the present invention for 1 liter of tank water. For example, for a 1 m$^3$ tank, mix 2 grams of the water-treatment composition of the present invention in clean sea water. Hatchery tanks and water should be clean. Hatcher tanks are tested to be free of green *Vibrio* bacteria, diseases (Vibriosis, EMS, WSSV, and EHP), and low in levels of yellow *Vibrio* bacteria.

For the Hatchery tanks, use 0.5 ppm of the feed additive composition of the present invention per 1 cubic meter of tank water volume mixed directly into the tank water. Use this dosage starting at the Nauplii stage through Zoea 3 and Mysis to PL (1-4) stages.

Use the water-treatment composition of the present invention to maintain hatchery tank water quality and suppress *Vibrio* growth. Activate the water-treatment composition of the present invention prior to adding to the hatchery tank water.

TABLE 1

Activation Formula Using Molasses

| Water-treatment Composition (g) | NaHCO$_3$ (g) | Mineral Mix (g) | Molasses (g) | Water (g) |
|---|---|---|---|---|
| 1 | 1 | 1 | 1 | 1 |

TABLE 2

Activation Formula Using Brown Sugar

| Water-treatment Composition (g) | NaHCO$_3$ (g) | Mineral Mix (g) | Brown Sugar (g) | Water (g) |
|---|---|---|---|---|
| 1 | 1 | 1 | 0.247 | 1 |

TABLE 3

Activated Microbial Composition of the Present Invention Application Rates

| Stage | Volume of Activation Solution (L) | Water Volume (m$^3$) |
|---|---|---|
| Nauplii to Zoea 3 | 1 | 1 |
| Mysis 1 to post-larvae (PLs) | 2 | 1 |

The mineral mix includes dipotassium phosphate, calcium proprionate, manganese glycinate, selenium salt, iron glycinate, copper glycinate, zinc glycinate, and cobalt chloride. In some embodiments, the mineral mix includes about 64% dipotassium phosphate by weight, about 20% calcium proprionate by weight, about 4.5% manganese glycinate by weight, about 2.7% selenium salt by weight, about 3.1% iron glycinate by weight, about 2.8% copper glycinate by weight, about 2.7% zinc glycinate by weight, and about 0.08% cobalt chloride by weight.

Preparation for activation of water-treatment composition: (1) to make a 20 L carboy of activation mixture, weigh out 20 grams of the water-treatment composition; (2) add an appropriate amount of NaHCO$_3$, a mineral mix, molasses or brown sugar to the appropriate amount of disinfected fresh water and mix (if salt water is used, it should be thoroughly disinfected to eliminate *Vibrio*); (3) add the water-treatment composition and mix; and (4) aerate the mixture for 18 hours. In the event of high total ammonia nitrogen (TAN>1 ppm) or high *Vibrio* counts (over 10$^3$ CFU/mL), increase the dosage of water-treatment composition, NaHCO$_3$, and high quality mineral mix to 2 g/L.

Directions for use: (1) apply three hours prior to stocking nauplii; (2) after activation is complete, apply mixture over the larval tank water surface to ensure the product is spread evenly; (3) rinse out the activation container with disinfected water and add this rinse to the larval tank; and (4) apply activated water-treatment composition once every day during the hatchery cycle. In the event of high total ammonia nitrogen (TAN>1 ppm) or high *Vibrio* counts (over 10$^3$ CFU/mL), increase the dosage of water-treatment composition, NaHCO$_3$, and high quality mineral mix to 2 g/L.

Once shrimp transition from PL4 to PL5, enriched live feed and artificial feed are introduced. At this stage, the feed additive composition of the present invention is added to the live feed at a rate of 0.02 g/liter of tank water. The compound docosahexaenoic acid (DHA) is also added at a rate of 0.6 g/liter tank water. Harvest enriched live feed after 20-24 hours and feed to PL 5-10 until harvest.

When artificial feed is introduced, tank water quality may start to decrease, and *Vibrio* levels may increase. At this stage, the dosage of water-treatment composition of the present invention is increased to 2 ppm. At the stage when artificial feed is being used, increase water-treatment composition dosage to 2 grams per 1 cubic meter of tank water volume per day.

Prior to nursery stocking, shrimp seed is quality tested, and passes a salinity stress test.

When shrimp reach PL10 another salinity stress test is carried out. It is recommended not to conduct the salinity stress test during the molting stage.

Once PL's reach PL (12) stage, they are transferred to nursery tanks for further maturation prior to grow out.

PL's (PL12) from the hatchery are tested prior to nursery stocking to be free of green *Vibrio* bacteria, diseases (Vibriosis, EMS, WSSV, and EHP), and low in levels of yellow *Vibrio* bacteria.

(2) Nursery Protocol: Nursery tanks (or ponds) and water should be clean. Tanks (or pond soil) are tested to be free of green *Vibrio* bacteria, diseases (Vibriosis, EMS, WSSV, and EHP), and low in levels of yellow *Vibrio* bacteria.

To maintain water quality and suppress *Vibrio* growth, prior to nursery stocking, the tanks (or pond) water is pre-conditioned for 3-5 days before stocking PL's with the activated water-treatment composition of the present invention.

If the nursery uses tanks, the tank water is preconditioned for 3-5 days prior to stocking using the activated water-treatment composition of the present invention added to each tank at a rate of 1 ppm per tank. Water quality is checked daily. For increasing ammonia levels (TAN), declining water quality, or increasing *vibrio* growth, dose the water-treatment composition of the present invention according to Table 4 or 5.

TABLE 4

For activation with molasses

| Stage of Water Treatment | Water-treatment Composition (g) | Molasses (g) | Rice Bran (g) | Mineral Mix (g) | NaHCO$_3$ (g) | Water (L) |
|---|---|---|---|---|---|---|
| Daily Microbial Maturation (7 days) | 1 | 5 | 5 | 1 | 1 | 1 |
| Post Maturation Daily Application Dosage (Secchi disk > 35 cm) | 1 | 5 | 5 | 1 | 1 | 1 |
| Post Maturation Daily Application Dosage (Secchi disk < 35 cm) | 1 | 5 | 0 | 1 | 1 | 1 |

TABLE 5

For activation with brown sugar

| Stage of Water Treatment | Water-treatment Composition (g) | Brown Sugar (g) | Rice Bran (g) | Mineral Mix (g) | NaHCO$_3$ (g) | Water (L) |
|---|---|---|---|---|---|---|
| Daily Microbial Maturation (7 days) | 1 | 1.37 | 5 | 1 | 1 | 1 |
| Post Maturation Daily Application Dosage (Secchi disk > 35 cm) | 1 | 1.37 | 5 | 1 | 1 | 1 |
| Post Maturation Daily Application Dosage (Secchi disk < 35 cm) | 1 | 1.37 | 0 | 1 | 1 | 1 |

If ponds are used for the nursery instead of tanks, the pond water is preconditioned for 3-5 days using the activated water-treatment composition of the present invention added to each pond at a rate of 1 kg/Ha per pond. Water quality is checked daily. For increasing ammonia levels (TAN), declining water quality, or increasing *vibrio* growth, dose the water-treatment composition of the present invention according to Table 6.

TABLE 6

| Condition | Dosage (g/m$^3$) | Rice Bran |
|---|---|---|
| For Microbial Maturation | 1 | — |
| Secchi disk Reading >35 cm After Microbial Maturation | 1 | 5.0 |
| Secchi disk Reading ≤35 cm After Microbial Maturation | 1 | — |
| Water Exchange >10% After Microbial Maturation | 1 | — |
| Optimum Conditions After Microbial Maturation (TAN <2.5 ppm, Nitrite <5 ppm, Secchi Disk Reading <35 cm, Vibrio counts are <10$^3$ CFU/mL, and total heterotrophs >10$^5$ CFU/mL) | 0.5 | — |
| Suboptimum Conditions After Microbial Maturation (TAN ≥2.5 ppm, Nitrite ≥5 ppm, Vibrio counts are ≥10$^3$ CFU/mL, or total heterotrophs ≤10$^5$ CFU/mL) | 2.0 | — |

For artificial feeds at the nursery stage, the feed additive composition of the present invention is coated directly onto the feed and delivered per feeding regimen at a rate of 0.5 g/kg feed according to the following: For coating compound extruded or pelleted feeds, (1) dissolve 0.5 g of the feed additive composition of the present invention in 12 milliliters of water or 12 milliliters of a 1:1 ratio of water+molasses; and (2) spray the mixture evenly onto the feed. Mix the feed while spraying to make sure the feed is coated evenly with the spray mixture.

PLs are stocked into nursery tanks or ponds at stocking densities consistent with farm practices. Stock PLs at stage PL10-12 with shrimp of uniform size having dark or light brown color. The PL's with red, blue or green color are rejected.

Nursery tank water quality is monitored regularly during the nursery phase.

Nursery PL's are grown out to maturation according to farm practices.

At harvest, shrimp PL (25-30) from each of the nursery tanks or ponds are tested to be free of green *Vibrio* bacteria, diseases (Vibriosis, EMS, WSSV, and EHP), and low in levels of yellow *Vibrio* bacteria.

PL's are also sampled and analyzed for count and growth prior to stocking in grow out.

Grow out pond protocol: Shrimp from the nursery phase are harvested from the nursery tanks/ponds and transferred to grow out ponds at stocking densities in accordance with farm practices. For pond preparation, prior to restocking, grow out ponds are cleaned, prepared, and assessed for acceptability.

Plastic Lined Pond Preparation: Prior to filling and restocking, plastic lined ponds are drained, cleaned of detritus and washed down (with a chlorine solution) to disinfect the ponds and remove biofilms that may be adhering to the plastic). Pond intake and outtake water gates are sealed to prevent entry of seawater. Plastic-liners are repaired and sealed to prevent seepage water from leaking to the pond. The ponds are then dried and swept clean of any remaining organic detritus, dead shrimp and cleared of all crustaceans or potential disease carrying pests, including the side walls.

Earthen Pond Preparation: Prior to filling and restocking, the pond is drained completely. After harvest, all dead shrimp are removed. Sludge and organic matter are pumped from the pond or manually removed. Ponds need to be dried before filling, limed after each grow out, and plowed at least once per year. Pond soil is tested for pH, limed (with the appropriate lime application rate defined by the soil pH) and dried for at least 7 days prior to refilling or until the soil pH returns close to neutrality. Pond soil is also tested to be free of green *Vibrio* bacteria, diseases (Vibriosis, EMS, WSSV, and EHP), and low in levels of yellow *Vibrio* bacteria before refilling with water and stocking.

After drying, clean filtered water is added to the ponds filled to a depth of 100 cm.

Then, the water-treatment composition is dosed according to Table 7.

TABLE 7

| Condition | Dosage (g/m$^3$) | Rice Bran (g) |
|---|---|---|
| For Microbial Maturation | 0.8 | — |
| Secchi disk Reading >35 cm After Microbial Maturation | 0.15 | 0.75 |
| Secchi disk Reading ≤35 cm After Microbial Maturation | 0.15 | — |
| Water Exchange >10% After Microbial Maturation | 0.15 | — |
| Optimum Conditions After Microbial Maturation (TAN <2.5 ppm, Nitrite <5 ppm, Secchi Disk Reading <35 cm, Vibrio counts are <10$^3$ CFU/mL, and total heterotrophs >10$^5$ CFU/mL) | 0.075 | — |
| Suboptimum Conditions After Microbial Maturation (TAN ≥2.5 ppm, Nitrite ≥5 ppm, Vibrio counts are ≥10$^3$ CFU/mL, or total heterotrophs ≤10$^5$ CFU/mL) | 0.3 | — |

If applicable, reservoir, canal and pond water are tested regularly to be free of disease (Vibriosis, EMS, WSSV, and EHP). If possible, water used for restocking grow out ponds should also be retained in the reservoirs until it becomes populated with secondary productivity species such as Copepods and Rotifers. The water-treatment of the present invention is applied to the reservoir on a regular basis to maintain a population of beneficial heterotrophic bacteria. A dose of 1 kg/ha of the water-treatment of the present invention is applied during the filling process, then a weekly maintenance dose of 500 g/ha would be applied thereafter.

On at least a weekly basis, water quality measurements are taken including: water pH, temperature, salinity and alkalinity—while also sampling water and sediment for bacteriology (*Vibrio* Speciation).

To maintain optimum water quality and remediate waste organic build up during grow out, the activated water-treatment composition of the present invention is added to each grow out pond at a daily rate according to Table 7.

For distressed pond management, apply the activated water-treatment of the present invention per dosing instructions in Table 7 to allow for water maturation.

The feed additive composition of the present invention can be coated directly onto feed. For coating compound extruded or pelleted feeds: (1) dissolve appropriate amount of the feed additive composition of the present invention in 12 milliliters of water or 12 milliliters of a 1:1 ratio of water+molasses; and (2) spray the mixture evenly onto the feed. Mix the feed while spraying to make sure the feed is coated evenly with the spray mixture.

The grow out ponds are tested routinely for water quality and *vibrio* levels during the grow out phase. Shrimp quality, appearance, growth and weight are also monitored regularly.

Example 5

The experiments were done in four 18 m$^3$ tanks with 5 million nauplii per tank. Two of the tanks were control and two of the tanks were BiOWiSH treated (i.e., treated with the compositions of the present invention). In all the control tanks, the nauplii (first larval stage for shrimp) were fed a standard diet, but in the BiOWiSH tanks, the diet was augmented with the feed additive composition of the present invention. Results are shown in Table 8.

TABLE 8

| Batch | Particulars | Total PL Harvested (2 tanks combined) | |
|---|---|---|---|
| | | Control | BiOWiSH |
| 25 Mar-12 Apr | 18 m$^3$ tanks 5 million nauplii per tank 2 BiOWiSH tanks and 2 control tanks Harvested at PL 10 | 4.17 million | 4.25 million |
| 31 Mar-18 Apr | 18 m$^3$ tanks 5 million nauplii per tank 2 BiOWiSH tanks and 2 control tanks Harvested at PL 9 | 3.80 million | 4.00 million |

In the above, PL means "Post Larva" and the number denotes the days past the larval stage. In the BiOWiSH tanks, more PL's were recovered (more survived). The harvested PL's were subjected to pH, Salinity, and temperature stress tests as shown in Table 9.

| | PL Size | | Body:Gut Ratio | | Stress Tests | | |
|---|---|---|---|---|---|---|---|
| | PL 8 | PL 10 | PL 9 | PL 10 | pH | Salinity | Temperature |
| BiOWiSH | 7.55 | 7.97 | 98% | 98% | 82.06% | 47.84% | 73.04% |
| Control | 7.27 | 7.86 | 92% | 94% | 70.44% | 32.76% | 56.71% |

In the pH stress test, pH is raised from 7.8 to 9.7-10 (30 minutes up and 30 minutes back) and the pH where mortality sets in is recorded. Note that the BiOWiSH PL's show mortality at more alkaline pH than the controls.

In the salinity test, the PL's are put in freshwater for 10 minutes then back to normal seawater salinity (29 ppt) and survivability is recorded. More of the BiOWiSH PL's survive the salinity test than the control PL's.

In the temperature test, temperature is dropped by 10° C. for 10 minutes then back up to 24° C. for 20 minutes and surviving PL's counted. The BiOWiSH PL's show better survivability.

EQUIVALENTS

While the present invention has been described in conjunction with the specific embodiments set forth above, many alternatives, modifications and other variations thereof will be apparent to those of ordinary skill in the art. All such alternatives, modifications and variations are intended to fall within the spirit and scope of the present invention.

The invention claimed is:

1. A method of raising an aquatic animal in an aquaculture system, the method comprising:
   a. contacting the aquaculture system with a water-treatment composition over a first period of time, wherein the water-treatment composition comprises *Bacillus subtilis, Bacillus amyloliquefaciens, Bacillus licheniformis, Bacillus pumilus, Bacillus mojavensis, Pediococcus acidilactici, Pediococcus pentosaceus*, and *Lactobacillus plantarum*; and
   b. contacting the aquaculture system with a feed additive composition to feed the aquatic animal over a second period of time, wherein the feed additive composition comprises *Pediococcus acidilactici, Pediococcus pentosaceus, Lactobacillus plantarum*, and *Bacillus subtilis* 34 KLB, wherein:
      when the aquatic animal is finfish, the weight ratio of the water-treatment composition to the feed additive composition is from 70:1 to 105:1, or when the aquatic animal is shrimp, the weight ratio of the water-treatment composition to the feed additive composition is from 1:1 to 2:1 at the hatchery stage.

2. The method of claim 1, wherein the water-treatment composition is in the form of liquid or solid.

3. The method of claim 1, wherein the weight ratio of the *Bacillus subtilis, Bacillus amyloliquefaciens, Bacillus licheniformis, Bacillus pumilus*, and *Bacillus mojavensis* to the *Pediococcus acidilactici, Pediococcus pentosaceus*, and *Lactobacillus plantarum* in the water-treatment composition is between 1:10 to 10:1.

4. The method of claim 1, wherein the *Bacillus subtilis, Bacillus amyloliquefaciens, Bacillus licheniformis, Bacillus pumilus*, and *Bacillus mojavensis* in the water-treatment composition are individually aerobically fermented, harvested, freeze-dried, and ground to produce a powder having a mean particle size of about 200 microns, with greater than 60% of the mixture in the size range between 100-800 microns.

5. The method of claim 1, wherein the *Pediococcus acidilactici, Pediococcus pentosaceus*, and *Lactobacillus plantarum* in the water-treatment composition are individually aerobically fermented, harvested, freeze-dried, and ground to produce a powder having a mean particle size of about 200 microns, with greater than 60% of the mixture in the size range between 100-800 microns.

6. The method of claim 1, wherein the water-treatment composition further comprises at least 90% of a water-soluble diluent by weight.

7. The method of claim 6, wherein the water-soluble diluent is selected from dextrose monohydrate, anhydrous dextrose, sucrose, maltose, maltodextrin, sodium chloride, potassium chloride, calcium chloride, magnesium chloride, sodium sulfate, potassium sulfate, and magnesium sulfate.

8. The method of claim 1, wherein the *Bacillus subtilis* comprises *Bacillus subtilis* 34 KLB.

9. The method of claim 1, wherein the feed additive composition is in the form of liquid or solid.

10. The method of claim 1, wherein the *Pediococcus acidilactici, Pediococcus pentosaceus, Lactobacillus plantarum*, and *Bacillus subtilis* 34 KLB in the feed additive composition are individually aerobically fermented, harvested, freeze-dried, and ground to produce a powder having a mean particle size of about 200 microns, with greater than 60% of the mixture in the size range between 100-800 microns.

11. The method of claim 1, wherein the weight ratio of *Lactobacillus plantarum, Pediococcus pentosaceus*, and *Pediococcus acidilactici* is about 1:1:1.

12. The method of claim 1, wherein the feed additive composition comprises about 0.15% of *Bacillus subtilis* 34 KLB by weight.

13. The method of claim 1, wherein the feed additive composition comprises at least 90% of a water-soluble diluent by weight.

14. The method of claim 13, wherein the water-soluble diluent is selected from dextrose monohydrate, anhydrous dextrose, sucrose, maltose, maltodextrin, sodium chloride, potassium chloride, calcium chloride, magnesium chloride, sodium sulfate, potassium sulfate, and magnesium sulfate.

15. The method of claim 1, wherein the aquaculture system is dosed daily with the water-treatment composition.

16. The method of claim 15, wherein the water-treatment composition is provided at a dose of about 0.2 ppm to 10 ppm daily.

17. The method of claim 1, wherein the aquaculture system is dosed daily with the feed additive composition.

18. The method of claim 17, wherein the effective amount of the feed additive composition is about 0.5 ppm to 50 ppm daily.

19. The method of claim 1, wherein the first period of time is at least 7 days.

20. The method of claim 1, wherein the second period of time is at least 7 days.

21. The method of claim 1, wherein the method increases survivability of the aquatic animal by at least 5% as compared to a control where the water-treatment composition and feed additive composition are not used.

22. The method of claim 1, wherein the method increases biomass of the aquatic animal by at least 5% as compared to a control where the water-treatment composition and feed additive composition are not used.

23. The method of claim 1, further comprising coating or mixing a regular shrimp or fish feed with the feed additive composition prior to step (b).

24. The method of claim 1, further comprising contacting the aquaculture system with a regular shrimp or fish feed.

25. The method of claim 1, further comprising, prior to step (a), contacting the water-treatment composition with an activation composition to activate the water-treatment composition.

26. The method of claim 25, wherein the activation composition comprises molasses or brown sugar.

27. The method of claim 25, wherein the activation composition further comprises $NaHCO_3$ and a mineral mix.

* * * * *